March 20, 1951 E. J. DE NORMANVILLE 2,546,091
EPICYCLIC POWER TRANSMISSION MECHANISM
Filed March 12, 1948 2 Sheets-Sheet 1

Inventor
E. J. de Normanville
By Stewart Downing Buhler
Attys

March 20, 1951     E. J. DE NORMANVILLE     2,546,091
EPICYCLIC POWER TRANSMISSION MECHANISM Filed March 12, 1948     2 Sheets-Sheet 2

Inventor
E. J. de Normanville

Patented Mar. 20, 1951

2,546,091

UNITED STATES PATENT OFFICE 2,546,091

EPICYCLIC POWER TRANSMISSION MECHANISM

Edgar Joseph de Normanville, Berkhampstead, England

Application March 12, 1948, Serial No. 14,553
In Great Britain March 20, 1947

4 Claims. (Cl. 74—758)

This invention relates to epicyclic power transmission mechanisms, for use more particularly on mechanically propelled vehicles.

The main object of the invention is to provide an improved mechanism which is especially advantageous for use in a power transmission system consisting in part of a hydraulic torque-converter or coupling, and which enables the desired range of speed ratios to be provided in a simple and advantageous manner. Another object is to provide improved means for controlling speed changes in epicyclic power transmission mechanisms.

Figure 1:
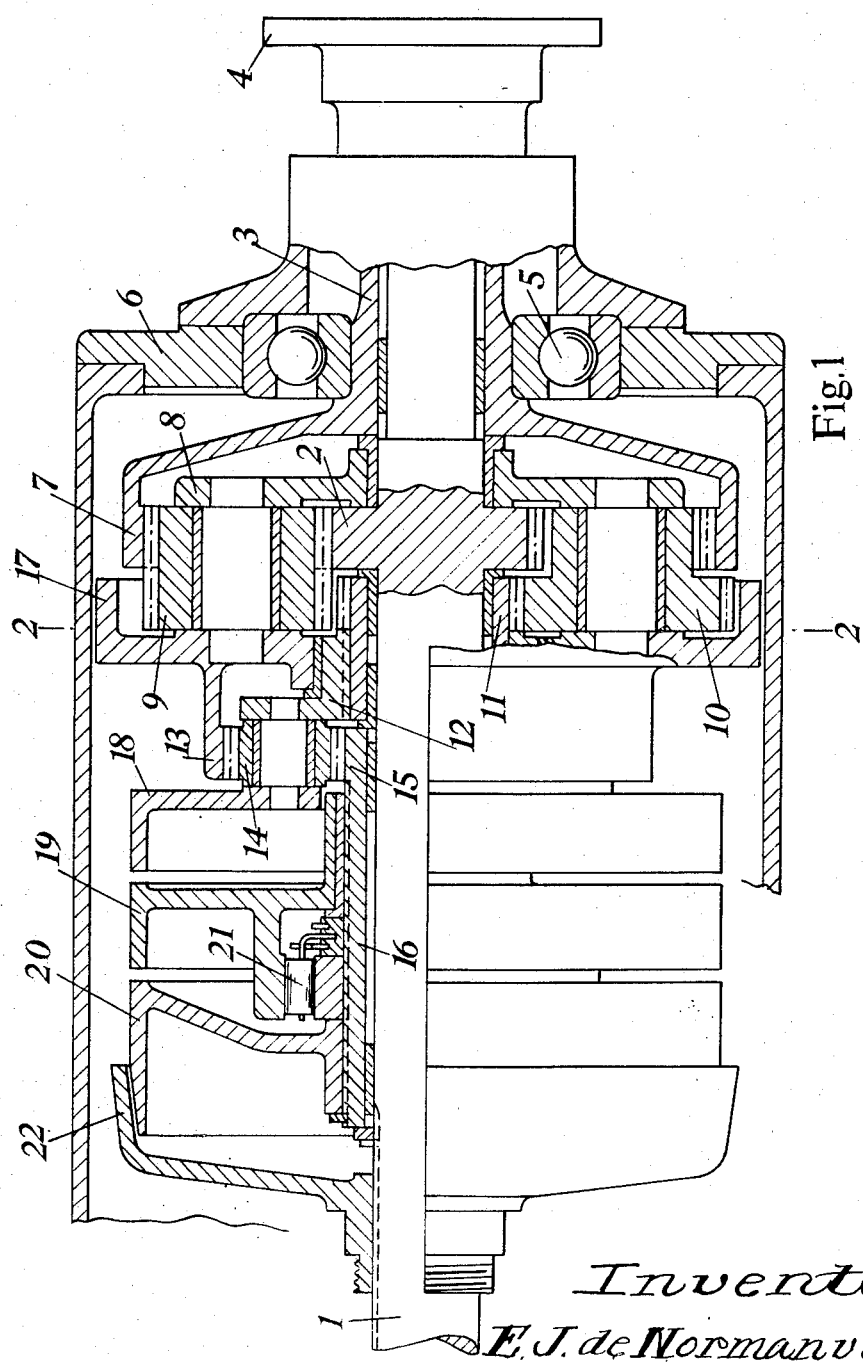
Figure 1 is a side elevation partly in section of a three speed epicyclic power transmission mechanism constructed in accordance with the invention.
Figure 2:
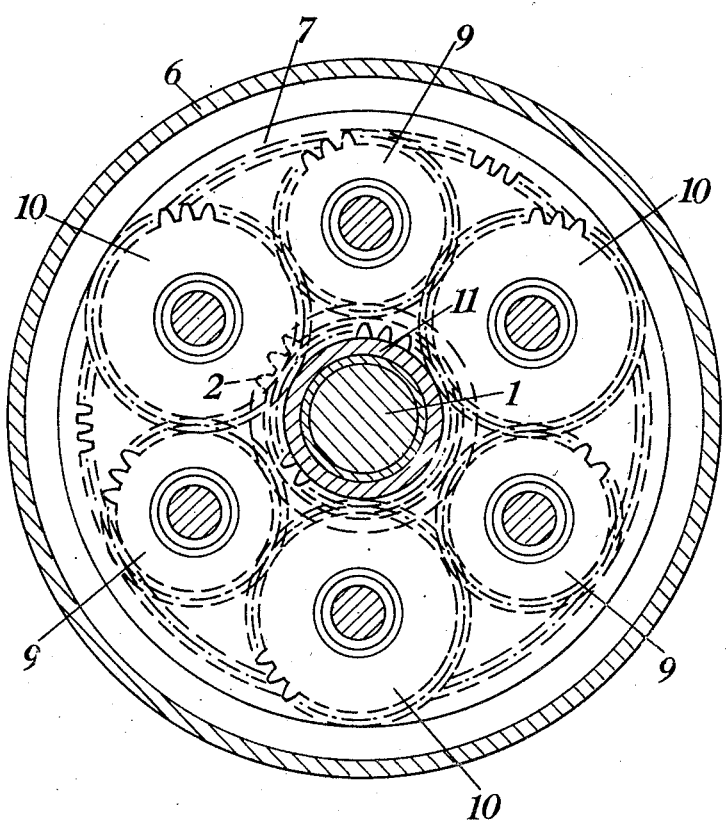
Figure 2 is a cross section on the line 2—2 of Figure 1 showing the arrangement of the sun and planet pinions.

In carrying the invention into effect as shown in the drawings, a driving shaft 1 has formed on or secured to it a sun pinion 2, and coaxially with the shaft 1 is arranged the driven shaft 3 having a coupling flange 4 and supported in a bearing 5 in the fixed casing 6. Upon the driven shaft 3 is formed or secured an internally toothed annulus 7. On the driving shaft 1 is also rotatably mounted a planet pinion carrier 8 on which are arranged interengaging planet pinions. Whilst a single pair of such pinions would suffice, it is preferable to employ (as usual) a plurality of such pairs, three symmetrically arranged pairs being convenient. Thus there are provided three pinions 9 engaging the sun pinion 2 and the annulus 7, and also engaging the three pinions 10. The pinions 10 engage a second or reaction sun pinion 11 mounted coaxially with and alongside the first sun pinion 2.

The above described gear train constitutes what is herein referred to as the principal train. In association with this train is arranged another train herein referred to as the secondary train. This comprises a planet pinion carrier 12 formed with or secured, for example by splines, to the second sun pinion 11 of the principal train, an internally toothed annulus 13 formed with or secured to the planet pinion carrier of the principal train, and at least one but preferably three equi-spaced planet pinions 14 mounted on the carrier 12 and engaging the annulus 13, and a sun pinion 15, the latter being formed on or secured to a sleeve 16 rotatably carried on the driving shaft 1. The relative diameters of the gear elements in the two trains are made appropriate to the various speed ratios to be provided.

For controlling the action of the mechanism above described, the following means are employed. On the planet pinion carrier 8 of the principal train is formed a brake drum 17, this having associated with it any convenient means (not shown in the drawing) for holding or releasing the drum. Likewise there is formed on the planet pinion carrier 12 of the secondary train a brake drum 18 for controlling rotation of this plant pinion carrier, and consequently controlling rotation of the reaction sun pinion 11 of the principal train. For controlling the rotation of the sun pinion of the secondary train, and through it that of the reaction sun pinion 11 of the principal train, two brake drums 19 and 20 are provided, these being interconnected by a unidirectional coupling, which may be of a known form comprising rollers 21. Also the brake drum 20 is adapted to be clutched to a complementary friction clutch member 22 secured to the driving shaft 1.

The arrangement is such that to effect rotation of the driven shaft at the same speed as the driving shaft, the sun pinion 15 of the secondary train is clutched to the driving shaft, all the brakes on the various drums being free, excepting the drum 19 which has a unidirectional connection with the pinion 15, this brake being preferably left in action. The intermediate speed ratio is obtained by holding against rotation the sun pinion 15 of the secondary train. This can be effected by braking one or both of the associated drums 19 and 20, according as to whether the mechanism is required to operate under "free-wheel" or "engine-braking" conditions. The low speed ratio is obtained by braking the drum 18 associated with the planet pinion carrier of the secondary train and likewise associated with the second sun pinion 11 of the principal train. Reverse rotation of the driven shaft is obtained by braking the planet pinion carrier 8 of the principal train by applying the brake to the drum 17.

If the brake drum 19 is held against rotation, the free wheel connection will make available sustained full power upward changes to top speed, and free wheel synchronisation downward changes from top speed to the intermediate ratio. It will be clear, however, that this brake drum alone would not enable the car to drive the engine for braking purposes on the intermediate speed. This is achieved by means of the brake drum 20. When both the drums 19 and 20 are held against rotation, the intermediate ratio is effective both ways, i. e. when the engine is driving the car or vice versa. When a change up from intermediate speed is made, the brake drum 20 is concurrently released, the full driving power on the intermediate ratio being sustained during the change by means of the braked drum 19 and the unidirectional coupling 21. The drum 19 is preferably braked all the time the car is in top gear or intermediate gear, thus reducing wear. When changing from top to intermediate gear in these circumstances, the drum 20 will automatically come to rest through the torque absorbing action of the free wheel connection. The band brake for drum 20 can then be applied without wear.

Whilst one object of the invention is to ensure that engine braking shall be available on all the gear ratios, it will readily be seen by those versed in the art that in any case where engine braking should not be desired on this intermediate ratio, the brake drum 20 could be dispensed with and the clutch member 22 arranged to engage with the brake member 19 without otherwise affecting the operation of the gearing as a whole.

In one example of a mechanism embodying the invention and designed to provide three speed ratios which are particularly suitable for a mechanism to be used with a fluid torque-converter or coupling, the sun pinions and annuli have the following relative dimensions:

Principal train—
    Annulus 86 teeth
    First sun pinion 34 teeth
    Second sun pinion 26 teeth
    Planet pinions 26 and 34 teeth
Secondary train—
    Annulus 58 teeth
    Sun pinion 26 teeth
    Planet pinions 16 teeth The gear ratios obtainable in this example are respectively, 1:1, 1.36:1, and 2.53:1.

In the example of gearing shown in the principal train of Figure 1 and in the train of Figure 3 the reverse ratio is identical with the low gear ratio. In any case where the reverse ratio is required to be other than the first speed ratio, compound planets may be employed in a known manner.

By this invention there is provided a simple and effective means of attaining the desired speed increment from the lowest gear ratio to the next higher ratio in a simple and efficient manner. This is effected by employing the negative rotational value of the reaction member of the first speed ratio and the positive rotational value of the reverse member of the gear train synchronously and additively to impart negative rotation to the reaction member of the intermediate gear ratio, when the gear train as a whole is in its neutral status. The invention also provides for sustained full power upward changes to top speed, and free wheel synchronisation downwards changes from top speed to the intermediate ratio, as well as enabling the car to drive the engine for braking purposes on the intermediate speed; or on the low gear.

The invention is not, however, restricted to the examples described above, since the relative dimensions of the gear elements and other details may be varied to suit different requirements.

Having thus described my invention what I claim as new and desire to secure by Letters Patent is:

1. Variable speed power transmission mechanism comprising a principal epicyclic gear train including a driving sun pinion, a reaction sun pinion arranged coaxially with the driving sun pinion, a rotatable planet pinion carrier, at least one pair of interengaging planet pinions mounted on the carrier and respectively engaging the driving and reaction sun pinions, and a driven annulus engaging the planet pinion which also engages the driving sun pinion, a secondary epicyclic gear train including a third sun pinion arranged coaxially with the sun pinions of the first train, a second annulus rigid with the planet pinion carrier of the first train, a second planet pinion carrier rigid with the reaction sun pinion of the first train, and at least one planet pinion mounted on the second carrier and engaging the third sun pinion and second annulus, brakable members which together with the secondary epicyclic gear train form means for controlling rotation of the reaction sun pinion, and a unidirectional coupling through which one of the brakable members is connected to the reaction sun pinion by way of the third sun pinion, the associated planet pinion, and the second planet pinion carrier.

2. Variable speed power transmission mechanism as claimed in claim 1, in which one of the brakable members has the form of a drum on the second planet pinion carrier, and in which another brake drum is provided on the other planet pinion carrier.

3. Variable speed power transmission mechanism as claimed in claim 1, in which the brakable members have the form of brake drums one of which is permanently connected to the third sun pinion, and another of which is connected to the third sun pinion through the unidirectional coupling.

4. Variable speed power transmission mechanism as claimed in claim 1 and having a friction clutch formed in part by one of the brakable members, and arranged to connect the third sun pinion to the driving sun pinion.

EDGAR JOSEPH DE NORMANVILLE.

REFERENCES CITED

The following references are of record in the file of this patent:

UNITED STATES PATENTS

| Number | Name | Date |
| --- | --- | --- |
| 944,597 | Brush | Dec. 28, 1909 |
| 1,383,988 | De Normanville | July 5, 1921 |
| 2,088,782 | Ford et al. | Aug. 3, 1937 |
| 2,339,269 | James | Jan. 18, 1944 |
| 2,368,684 | Simpson | Feb. 6, 1945 |